(12) United States Patent
Nakasu et al.

(10) Patent No.: US 9,367,237 B2
(45) Date of Patent: Jun. 14, 2016

(54) SHAPING DEVICE (71) Applicant: KABUSHIKI KAISHA TOSHIBA, Minato-ku, Tokyo (JP)

(72) Inventors: Toshiaki Nakasu, Tokyo (JP); Kazunori Imoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 247 days.

(21) Appl. No.: 14/198,171

(22) Filed: Mar. 5, 2014

(65) Prior Publication Data

US 2014/0354562 A1 Dec. 4, 2014

(30) Foreign Application Priority Data

May 30, 2013 (JP) .................... 2013-114674

(51) Int. Cl.
*G06F 3/0488* (2013.01)
*G06K 9/36* (2006.01)
*G06K 9/00* (2006.01)
*G06K 9/20* (2006.01)
*G06K 9/42* (2006.01)

(52) U.S. Cl.
CPC ........ *G06F 3/04883* (2013.01); *G06K 9/00476* (2013.01); *G06K 9/2054* (2013.01); *G06K 9/00416* (2013.01); *G06K 9/00463* (2013.01)

(58) Field of Classification Search
CPC ............ G06K 9/00476; G06K 9/2054; G06K 9/00463; G06K 9/00523; G06K 9/00416; G06K 9/00409; G06K 9/00402; G06K 9/00; G06F 3/0418; G06F 3/018; G06F 3/017; G06F 3/03545; G06F 3/03547; G06F 3/04883
USPC ........................................................ 345/173
See application file for complete search history.

(56) References Cited

U.S. PATENT DOCUMENTS

| | | | | |
|---|---|---|---|---|
| 6,651,221 B1* | 11/2003 | Thompson | ......... | G06K 9/00442 715/203 |
| 8,238,666 B2* | 8/2012 | Besley | ............... | G06K 9/00456 382/203 |
| 2002/0150297 A1* | 10/2002 | Gorbatov | ............... | G06K 9/222 382/202 |
| 2008/0123945 A1* | 5/2008 | Andrew | ............. | G06K 9/00456 382/164 |
| 2010/0171754 A1* | 7/2010 | Hatfield | ............. | G06K 9/00416 345/619 |
| 2011/0175821 A1* | 7/2011 | King | ................... | G06F 3/04883 345/173 |
| 2015/0169212 A1* | 6/2015 | Chang | .................... | G06K 9/222 715/780 |

FOREIGN PATENT DOCUMENTS

JP 2010-63938 3/2012
JP 2012-063938 A * 3/2012

* cited by examiner

*Primary Examiner* — Julie Anne Watko
(74) *Attorney, Agent, or Firm* — Knobbe, Martens, Olson & Bear, LLP (57) ABSTRACT

According to an embodiment, a shaping device includes a setting unit, a shaping unit, and a display control unit. The setting unit is configured to set, when the stroke group constitutes a figure of a first category, a first region in which no stroke is expected to exist and a second region in which a stroke is expected to exist in a circumscribing rectangle circumscribing the stroke group. The shaping unit is configured to shape the stroke group into the figure of the first category when a first feature value and a second feature value satisfy a first condition. The first feature value represents an occupancy condition of the stroke group in the first region. The second feature value represents an occupancy condition of the stroke group in the second region. The display control unit is configured to display a shaping result on a display unit.

11 Claims, 9 Drawing Sheets

SHAPING DEVICE

CROSS-REFERENCE TO RELATED APPLICATION

This application is based upon and claims the benefit of priority from Japanese Patent Application No. 2013-114674, filed on May 30, 2013; the entire contents of which are incorporated herein by reference.

FIELD

Embodiments described herein relate generally to a shaping device.

BACKGROUND

Technologies to recognize a stroke group handwritten by a user as a figure and to shape the stroke group into the recognized figure are known. In such technologies, robust recognition performance is required because a stroke group handwritten by a user does not necessarily represent a shape of a figure to be recognized correctly.

There is a technology to robustly recognize a stroke group handwritten by a user as a polygonal figure by, for example, performing recognition assuming that sampling points of strokes cluster in a vertex portion in which a speed of handwriting input tends to be slower.

In the above-described conventional technology, however, when the handwriting input stops moving during input of a stroke, when another stroke is additionally inputted during input of a stroke, and when another stroke is inputted while an inputted stroke is traced, then false recognition is likely to occur, because sampling points cluster also in a portion other than a vertex.

A problem to be solved by the present embodiments is provision of a shaping device that can improve recognition performance while maintaining robustness of recognition.

DETAILED DESCRIPTION

According to an embodiment, a shaping device includes an acquisition unit, a setting unit, a shaping unit, and a display control unit. The acquisition unit is configured to acquire a stroke group handwritten by a user. The setting unit is configured to set, when the stroke group constitutes a figure of a first category, a first region in which no stroke is expected to exist and a second region in which a stroke is expected to exist in a circumscribing rectangle circumscribing the stroke group. The shaping unit is configured to shape the stroke group into the figure of the first category when a first feature value and a second feature value satisfy a first condition. The first feature value represents an occupancy condition of the stroke group in the first region. The second feature value represents an occupancy condition of the stroke group in the second region. The display control unit is configured to display a shaping result on a display unit.

Embodiments will be described below in detail with reference to the accompanying drawings.

First Embodiment

Figure 1:
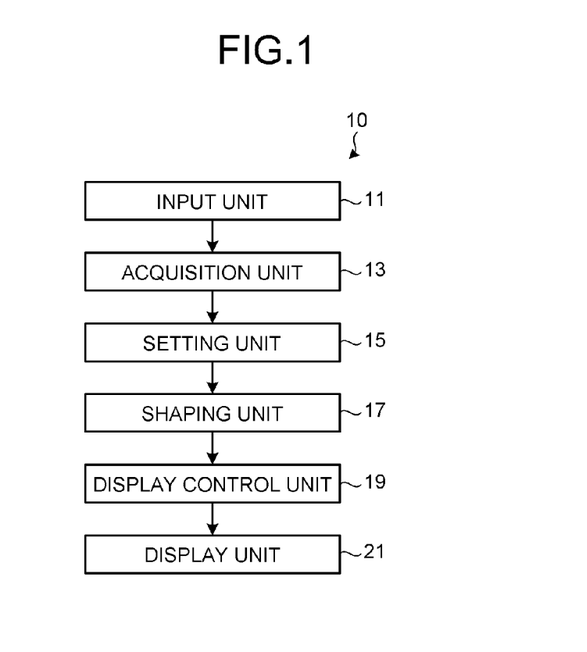
FIG. 1 is a configuration diagram illustrating an example of a shaping device according to a first embodiment.

FIG. 1 is a configuration diagram illustrating an example of a shaping device 10 according to a first embodiment. As illustrated in FIG. 1, the shaping device 10 includes an input unit 11, an acquisition unit 13, a setting unit 15, a shaping unit 17, a display control unit 19, and a display unit 21.

The shaping device 10 may be implemented by an information processing terminal that supports handwriting input, such as a tablet, a pen tablet, a tablet-type personal computer (PC), and a smartphone. The input unit 11 may be implemented by an input device that supports handwriting input, such as a touch panel, a touchpad, an electronic pen, and a mouse. The acquisition unit 13, the setting unit 15, the shaping unit 17, and the display control unit 19 may be implemented by, for example, execution of a program by a processing device, such as a central processing unit (CPU), that is, by software. The acquisition unit 13, the setting unit 15, the shaping unit 17, and the display control unit 19 may be implemented by hardware, such as an integrated circuit (IC), or by hardware and software together. The display unit 21 may be implemented by, for example, a display device, such as a touch-panel display and a liquid crystal display.

The input unit 11 inputs, into the shaping device 10, a stroke group handwritten (drawn) by a user with an intention of drawing a figure and the like. The first embodiment assumes that the input unit 11 is a touch panel and that a user inputs a stroke group by handwriting with a stylus pen on a touch panel, but is not limited to this method. For example, the input unit 11 may be implemented by a touchpad, an electronic pen, or a mouse.

Each stroke constituting the stroke group indicates one stroke of the user's handwriting input, that is, a trajectory of the stylus pen from touching an input surface of the touch panel until departing (from pen down until pen up). Data representing the stroke includes a sampling point (a time-series coordinate value) on the trajectory of the stylus pen relative to the input surface of the touch panel, a circumscribed rectangle of the trajectory, and a pen pressure of the trajectory.

Specifically, when the stylus pen is down onto the input surface of the touch panel, the touch panel regularly samples a point of the stylus pen on the trajectory relative to the input surface, the pen pressure of the trajectory, and a period of time having elapsed since the input of the trajectory started. When the stylus pen is up, the touch panel generates the data representing the stroke by extracting the circumscribed rectangle of the trajectory. The touch panel then inputs, into the shaping device 10, data representing the stroke group that is a set of the data representing the stroke.

Figure 2:
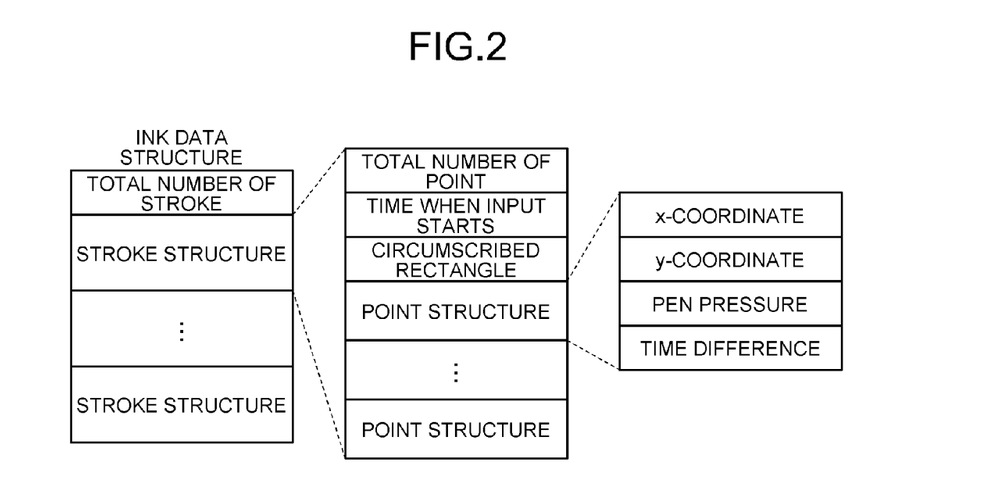
FIG. 2 is a diagram illustrating an example of data representing a stroke group according to the first embodiment.

FIG. 2 is a diagram illustrating an example of a data structure of the data representing the stroke group according to the first embodiment. In the first embodiment, the data representing the stroke group is represented by a three-level hierarchical data structure of an ink data structure, a stroke structure, and a point structure, but is not limited to this structure.

The ink data structure is a structure including a total number of the stroke constituting the stroke group, and the stroke structure of each stroke constituting the stroke group. The stroke structure is a structure including a total number of sampling points constituting the stroke, time when input of the stroke has started (time when the pen-down has started), the circumscribed rectangle of the stroke, and the point structure of each sampling point constituting the stroke. In the first embodiment, the circumscribed rectangle of the stroke is a rectangle having a minimum area and including the stroke, but is not limited to this rectangle. The point structures are a structure including an x-coordinate and a y-coordinate of the sampling point, the pen pressure, and a time difference from the start time.

A coordinate system of the x-coordinate and the y-coordinate may have an origin point at an upper left corner of the input surface of the touch panel. The coordinate system may be adapted so that the x-coordinate value increases as the sampling point moves rightward on the touch panel, and the y-coordinate value increases as the sampling point moves downward on the touch panel. Actual data of coordinate values may be described as the x-coordinate and the y-coordinate of the point structure. Alternatively, link information to the corresponding point structure may be described in a region of the point structure in the stroke structure by separately controlling the stroke structure data and the point structure data. If the touch panel cannot sample the pen pressure and if the pen pressure is not used in subsequent processes, the pen pressure in the point structure may be omitted, or a value indicating invalidity may be configured to the pen pressure in the point structure.

The acquisition unit 13 acquires the stroke group handwritten by the user. Specifically, the acquisition unit 13 acquires the stroke group inputted by the input unit 11.

The setting unit 15 configures a first region and a second region in the circumscribed rectangle circumscribing the stroke group acquired by the acquisition unit 13. In the first region, no stroke is expected to exist when the stroke group constitutes a figure of a predetermined category. In the second region, the stroke is expected to exist when the stroke group constitutes the figure of the predetermined category.

The first region and the second region may, depending on the figure of the predetermined category, be adapted so that, for example, the first region includes the center of the circumscribed rectangle, and the second region includes at least some part of an edge (a perimeter) of the circumscribed rectangle. Each of the first region and the second region does not need to be one region, and may include a plurality of regions. The first region and the second region may have portions that overlap each other.

The circumscribed rectangle circumscribing the stroke group may be generated from a circumscribed rectangle of each stroke that constitutes the stroke group by the setting unit 15. The circumscribed rectangle circumscribing the stroke group may be included in the data representing the stroke group described above.

Figure 3:
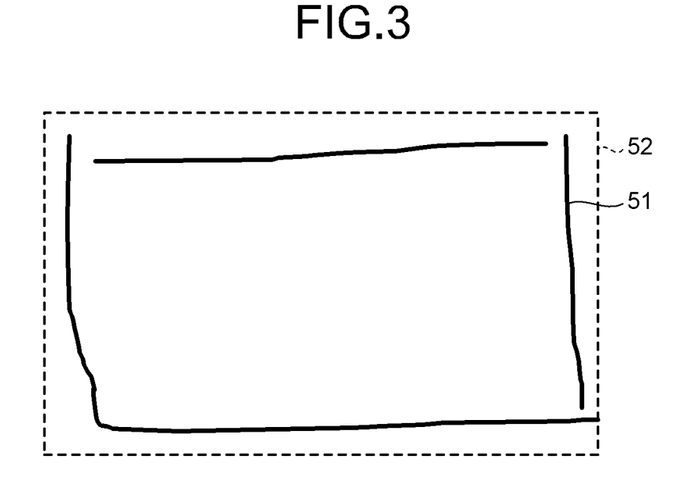
FIG. 3 is a diagram illustrating an example of a circumscribed rectangle circumscribing the stroke group according to the first embodiment.

FIG. 3 is a diagram illustrating an example of the circumscribed rectangle circumscribing the stroke group according to the first embodiment. In the example illustrated in FIG. 3, the circumscribed rectangle 52 circumscribes the stroke group 51 handwritten by the user with an intention of drawing a rectangle. In the first embodiment, in the same way as the circumscribed rectangle of the stroke, the circumscribed rectangle of the stroke group is a rectangle having a minimum area and including the stroke group, but is not limited to this rectangle.

Figure 4:
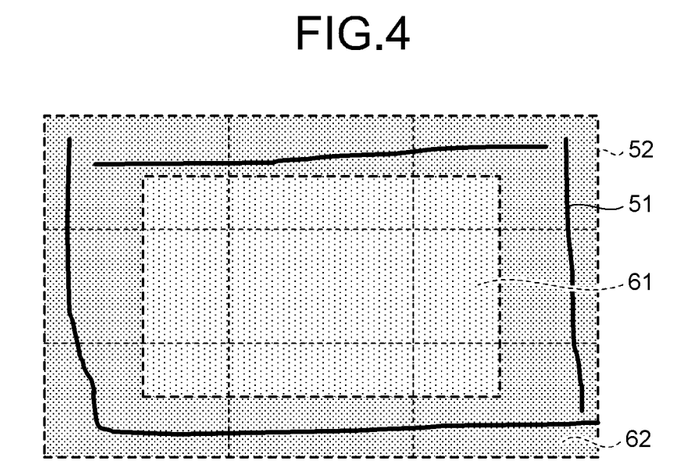
FIG. 4 is a diagram illustrating an example of a first region and a second region according to the first embodiment.
Figure 5:
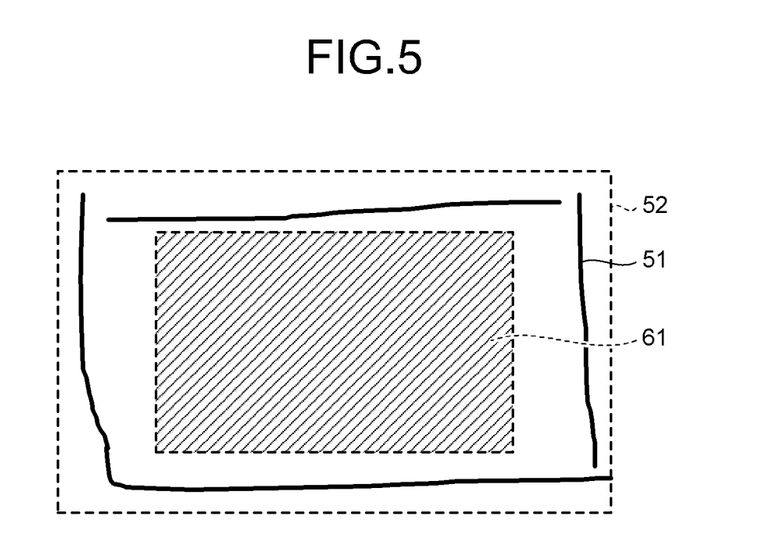
FIG. 5 is a detailed diagram of the first region according to the first embodiment.
Figure 6:
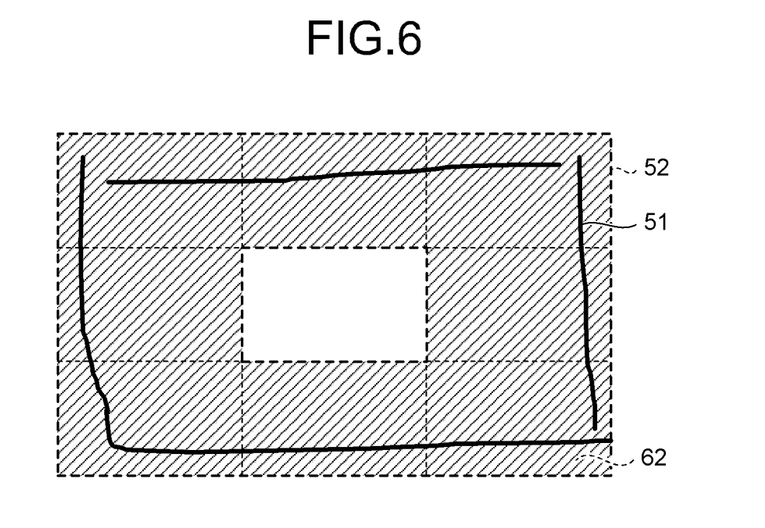
FIG. 6 is a detailed diagram of the second region according to the first embodiment.

FIG. 4 is a diagram illustrating an example of the first region and the second region of the first embodiment. FIG. 5 is a detailed diagram of the first region of the first embodiment. FIG. 6 is a detailed diagram of the second region of the first embodiment. The examples illustrated in FIGS. 4 to 6 assume a case where the figure of the predetermined category is a rectangle.

In the examples illustrated in FIGS. 4 and 5, the setting unit 15 configures, as a first region 61, a region that is generated by scaling the circumscribed rectangle 52 by a factor of $\alpha$ ($0<\alpha<1$) relative to the center of the circumscribed rectangle 52 in the circumscribed rectangle 52. In the examples illustrated in FIGS. 4 and 6, the setting unit 15 configures eight cells in the circumscribed rectangle 52 as a second region 62. The eight cells are cells that include the edge of the circumscribed rectangle 52 (touch the circumscribed rectangle 52) among cells generated by dividing the circumscribed rectangle 52 into m×n rectangles (where m and n are integers equal to or greater than 3, and where m=3 and n=3 in the examples illustrated in FIGS. 4 and 6).

The shaping unit 17 shapes the stroke group into the figure of the predetermined category when a first feature value and a second feature value satisfy a predetermined condition. The first feature value represents an occupancy condition of the stroke group acquired by the acquisition unit 13 in the first region configured by the setting unit 15. The second feature value represents an occupancy condition of the stroke group acquired by the acquisition unit 13 in the second region configured by the setting unit 15.

Specifically, the shaping unit 17 calculates the first feature value and the second feature value.

The first feature value can be at least one of, for example, the number of the sampling points of the stroke group in the first region, a total length of one or more strokes included in the first region among a plurality of strokes constituting the stroke group, and a total area in which a circumscribed rectangle of each of one or more strokes included in the first region among the plurality of strokes constituting the stroke group overlap the first region. Likewise, the second feature value can be at least one of, for example, the number of the sampling points of the stroke group in the second region, a total length of one or more strokes included in the second region among a plurality of strokes constituting the stroke group, and a total area in which a circumscribed rectangle of each of one or more strokes included in the second region among the plurality of strokes constituting the stroke group overlap the second region.

When the number of the sampling points of the stroke group is used as the first feature value and the second feature value, the shaping unit 17 may increase the number of the sampling points or perform sampling in advance so that the sampling points may be configured for a predetermined stroke length.

The shaping unit 17 then recognizes the stroke group acquired by the acquisition unit 13 as the figure of the predetermined category when the calculated first feature value is equal to or smaller than a first threshold value and when the calculated second feature value is equal to or greater than a second threshold value.

When the first region is made of a plurality of regions, the first feature value can be an average value or a total value of a first feature value of each region. Likewise, when the second region is made of a plurality of regions, the second feature value can be an average value or a total value of a second feature value of each region.

The shaping unit 17 may be adapted to determine at least either one of the first threshold value and the second threshold value by using at least either one of the first feature value and the second feature value. For example, the shaping unit 17 may determine a first proportion of all feature values (feature values that totals the first feature value and the second feature value) of the stroke group as the first threshold value, and determine a second proportion of all feature values of the stroke group as the second threshold value. The shaping unit 17 may calculate the feature value of the circumscribed rectangle of the stroke group. The shaping unit 17 may determine the first proportion of the calculated feature value as the first threshold value. The shaping unit 17 may determine the second proportion of the calculated feature value as the second threshold value.

The shaping unit 17 may determine the second threshold value by using the first threshold value. For example, the shaping unit 17 may determine that the second threshold value=$\beta \times$the first threshold value. In this case, the second threshold value is a value relative to the first threshold value. The shaping unit 17 may determine the first threshold value by using the second threshold value.

When the figure of the predetermined category is a rectangle, the shaping unit 17 recognizes the stroke group as a rectangle when a total length of the stroke group is equal to or greater than a predetermined proportion of a perimeter of the circumscribed rectangle.

When the figure of the predetermined category is a rectangle, the shaping unit 17 recognizes the stroke group as a rectangle when the stroke group has more horizontal components and vertical components than components other than horizontal components and vertical components.

When the figure of the predetermined category is a rectangle, it is preferable from a viewpoint of recognition accuracy that the shaping unit 17 recognizes the stroke group as a rectangle when three conditions are satisfied. The three conditions include, but are not limited to, the first feature value being equal to or smaller than the first threshold value and the second feature value being equal to or greater than the second threshold value, the total length of the stroke group being equal to or greater than the predetermined proportion of the perimeter of the circumscribed rectangle, and the stroke group having more horizontal components and vertical components than components other than horizontal components and vertical components.

The shaping unit 17 then shapes the stroke group acquired by the acquisition unit 13 into the recognized figure of the predetermined category. As a result, the stroke group is shaped into the figure of the predetermined category expressed in an aspect that the figure is made of a plurality of straight lines, and that an end of each straight line is connected to an end of another straight line.

Figure 7:
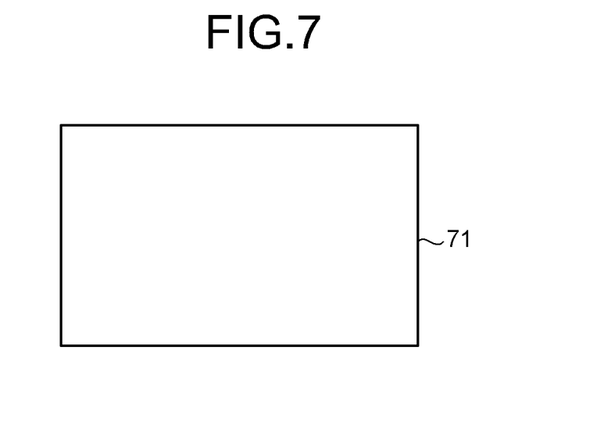
FIG. 7 is a diagram illustrating an example of a shaping result to a figure of a predetermined category according to the first embodiment.

FIG. 7 is a diagram illustrating an example of a shaping result into the figure of the predetermined category according to the first embodiment. The example illustrated in FIG. 7 assumes a case where the figure of the predetermined category is a rectangle. The stroke group is shaped into a rectangle 71 expressed in an aspect that the figure is made of four straight lines and that an end of each straight line is connected to an end of another straight line.

As a shaping result, the shaping unit 17 may generate a stroke of a shaped rectangle, or generate image data of the shaped rectangle. For example, the stroke of the shaped rectangle may be a stroke along the edge of the circumscribed rectangle. The stroke of the shaped rectangle may be a stroke shaped based on a position of a stroke group corresponding to each side of the rectangle. For example, the image data of the shaped rectangle may be an existing rectangle model or an image illustrating a rectangle transformed along the circumscribed rectangle.

The display control unit 19 displays the shaping result on the display unit 21. Specifically, the display control unit 19 displays the stroke of the shaped rectangle or the image data of the shaped rectangle on the display unit 21. The display control unit 19 may make a display by changing a line color so that the shaped portion may be conspicuous. By storing the data representing the stroke group as well in a storage unit that is not illustrated, the display control unit 19 may switch the display between the stroke group, and the stroke of the shaped rectangle or the image data of the shaped rectangle.

Figure 8:
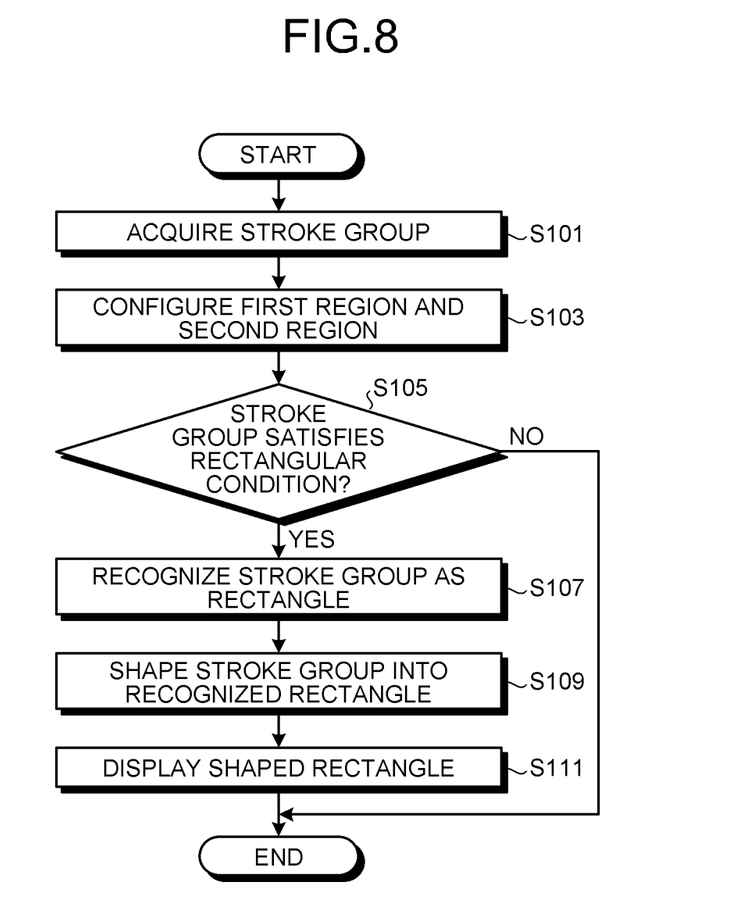
FIG. 8 is a flowchart illustrating an example of a process according to the first embodiment.

FIG. 8 is a flowchart illustrating an example of a flow of a procedure of a process performed by the shaping device 10 according to the first embodiment. The example illustrated in FIG. 8 assumes a case where the figure of the predetermined category is a rectangle.

First, the acquisition unit 13 acquires a stroke group handwritten by a user (step S101).

Subsequently, the setting unit 15 configures a first region and a second region in a circumscribed rectangle circumscribing the stroke group acquired by the acquisition unit 13. In the first region, no stroke is expected to exist when the stroke group constitutes the rectangle. In the second region, the stroke is expected to exist when the stroke group constitutes the rectangle (step S103).

Subsequently, the shaping unit 17 checks whether the stroke group acquired by the acquisition unit 13 satisfies a rectangular condition (step S105). The rectangular condition herein assumes three conditions including, but not limited to, the first feature value being equal to or smaller than the first threshold value and the second feature value being equal to or greater than the second threshold value, the total length of the stroke group being equal to or greater than the predetermined proportion of the perimeter of the circumscribed rectangle, and the stroke group having more horizontal components and vertical components than components other than horizontal components and vertical components. When the stroke group does not satisfy the rectangular condition (No at step S105), the process ends. The display control unit 19 may perform error handling or other processes (for example, notification saying that rectangle recognition has failed).

When the stroke group satisfies the rectangular condition (Yes at step S105), in contrast, the shaping unit 17 recognizes the stroke group as a rectangle (step S107), and shapes the stroke group into the recognized rectangle (step S109).

Subsequently, the display control unit 19 specifically displays the stroke of the shaped rectangle and the image data of the shaped rectangle on the display unit 21 (step S111).

As described above, the first embodiment improves recognition performance while maintaining robustness of recognition because the stroke group handwritten by the user is recognized as the figure of the predetermined category and shaped by using the first feature value and the second feature value. The first feature value represents the occupancy condition of the stroke group in the first region in which no stroke is expected to exist. The second feature value represents the occupancy condition of the stroke group in the second region in which the stroke is expected to exist.

Especially in the first embodiment, the first feature value and the second feature value representing the occupancy condition of the stroke group are used for recognition. Therefore, even if a gap exists between ends of the strokes to be connected, the strokes can be recognized as the figure of the predetermined category, which maintains robustness of recognition. In addition, even if a blur (such as a shake, addition of handwriting, and an overlap) occurs in the stroke, the stroke group can be correctly recognized as the figure of the predetermined category, which allows improvement of recognition performance.

Second Embodiment

In a second embodiment, in shaping a stroke group, an example will be described in which a stroke group to be processed as described in the first embodiment is extracted, and shaping described in the first embodiment is performed. The following description will focus on a difference from the first embodiment. Similar names and reference numerals to those in the first embodiment are used to denote components having similar functions to those in the first embodiment, and further description thereof will be omitted.

Figure 9:
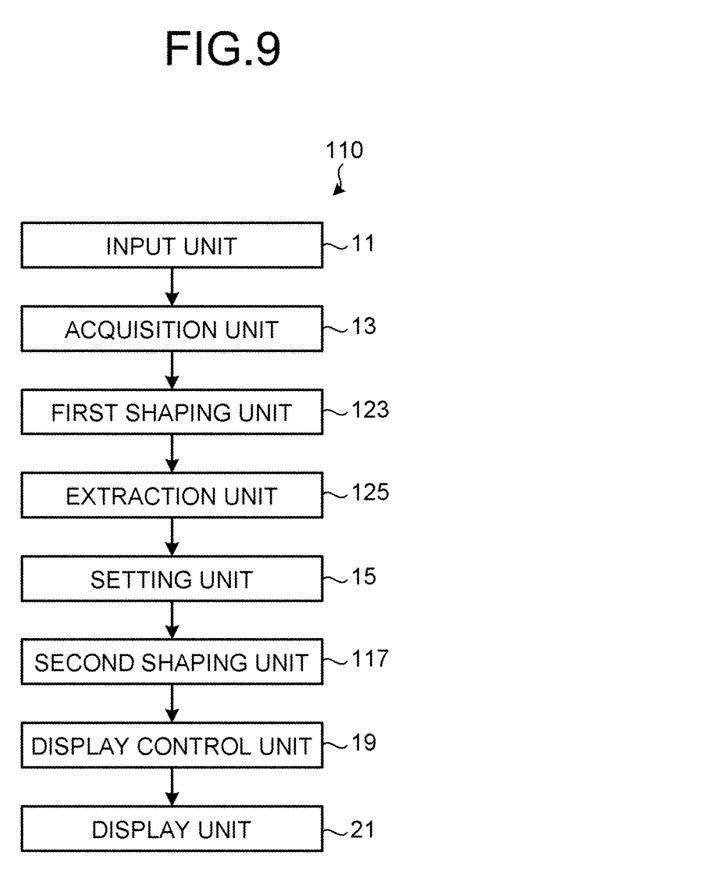
FIG. 9 is a configuration diagram illustrating an example of a shaping device according to a second embodiment.

FIG. 9 is a configuration diagram illustrating an example of a shaping device 110 according to the second embodiment. As illustrated in FIG. 9, the shaping device 110 of the second embodiment differs from that of the first embodiment in a first shaping unit 123 and an extraction unit 125. A second shaping unit 117 corresponds to the shaping unit 17 of the first embodiment.

Figure 10:
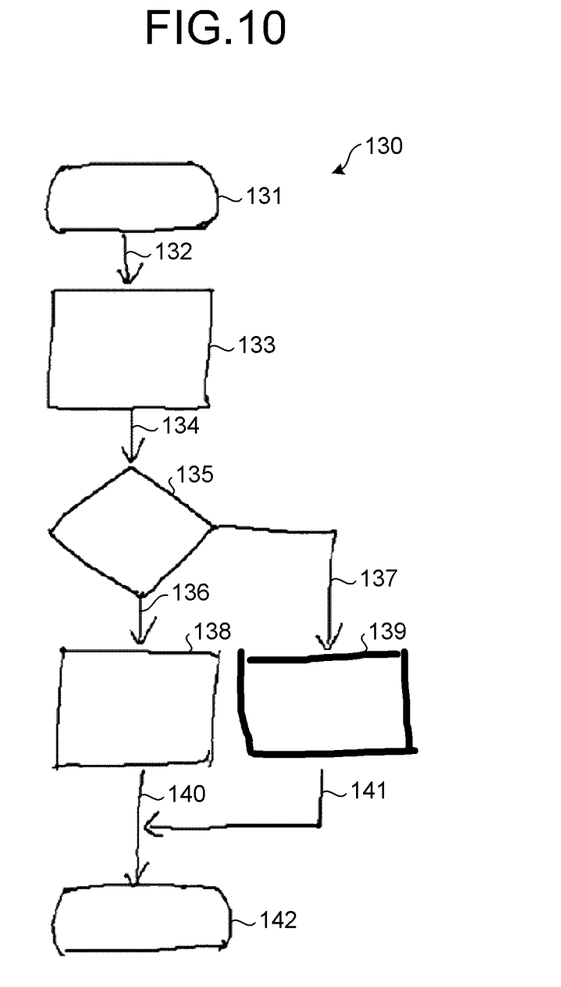
FIG. 10 is a diagram illustrating an example of a stroke group set according to the second embodiment.

In the second embodiment, an acquisition unit 13 acquires a set of stroke groups 131 to 142 from an input unit 11 as a stroke group set 130 handwritten by a user with an intention of drawing a flowchart (refer to FIG. 10).

The first shaping unit 123 recognizes and shapes the stroke groups 131 to 142 that constitute the stroke group set 130 acquired by the acquisition unit 13. Different from the recognition and shaping techniques described in the first embodiment, the first shaping unit 123 recognizes the stroke groups 131 to 142 by pattern matching using learning data obtained by machine learning of figures (such as a terminator, a rectangle, a rhombus, and an arrow) or other methods. The first shaping unit 123 then shapes the stroke groups into the recognized figure.

It is however difficult to perform robust recognition by the recognition technique of the first shaping unit 123. Therefore, as is the case with the stroke group 139 (corresponding to the stroke group 51 of the first embodiment), when a gap exists between ends of the strokes, the stroke group cannot be recognized as a rectangle.

The extraction unit 125 extracts stroke groups that have failed in recognition by the first shaping unit 123 from among the stroke group set 130 acquired by the acquisition unit 13. Assume that the extraction unit 125 extracts the stroke group 139. For example, the extraction unit 125 configures a region for extraction based on stroke groups that have failed in recognition by the first shaping unit 123. The extraction unit 125 then extracts stroke groups included in the region for extraction.

Figure 11:
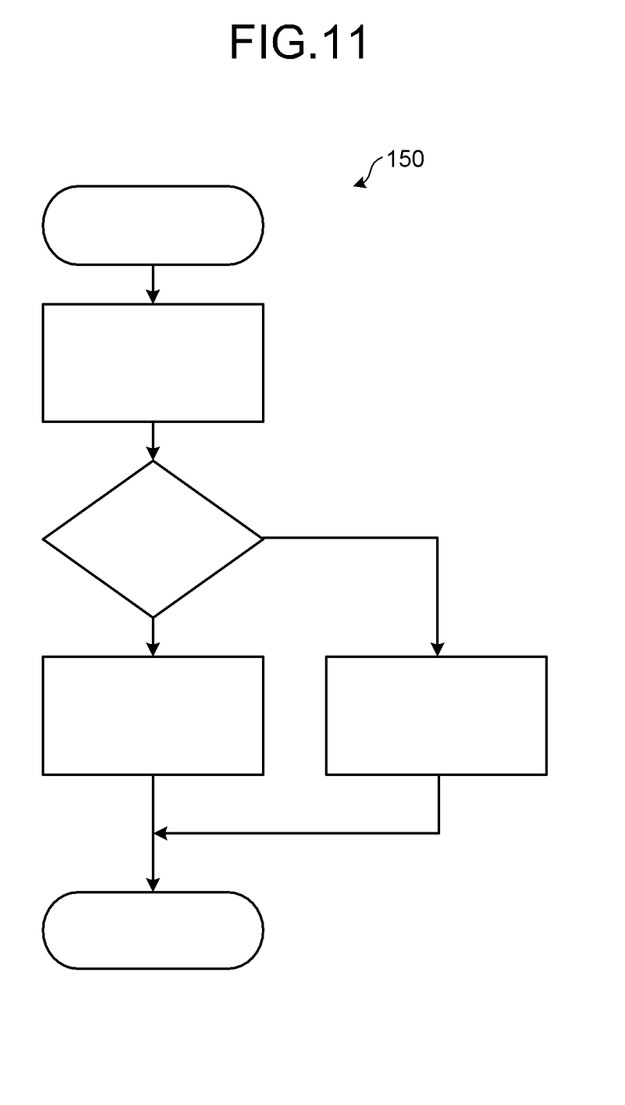
FIG. 11 is a diagram illustrating an example of a shaping result according to the second embodiment.

Hereinafter, the setting unit 15 and the second shaping unit 117 perform a process similar to that in the first embodiment on the stroke group 139 extracted by the extraction unit 125. The display control unit 19 merges a shaping result of the first shaping unit 123 and a shaping result of the second shaping unit 117. The display control unit 19 then displays, for example, a shaped flowchart 150 as illustrated in FIG. 11 on the display unit 21.

Application of the process described in the first embodiment to the second embodiment can improve recognition performance while maintaining a recognition speed and recognition robustness.

First Modification

In the above-described each embodiment, the example of the rectangle has been described as the figure of the predetermined category. In a first modification, a case where a figure of a predetermined category is L-shaped will be described.

Figure 12:
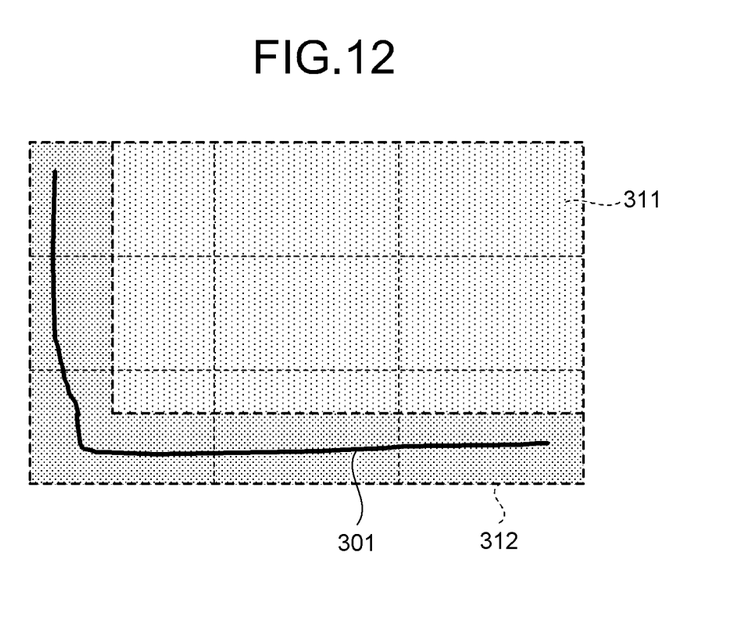
FIG. 12 is a diagram illustrating an example of a first region and a second region according to a first modification.

FIG. 12 is a diagram illustrating an example of a first region and a second region of the first modification. The example illustrated in FIG. 12 assumes the case where the figure of the predetermined category is L-shaped, as described above.

In the example illustrated in FIG. 12, a setting unit 15 configures, as a first region 311, a region that is generated by scaling a circumscribed rectangle 312 of an L-shaped stroke group 301 by a factor of α (0<α<1) relative to one vertex of the circumscribed rectangle 312 in the circumscribed rectangle 312. Because the L-shaped stroke group 301 protrudes in a lower left direction in the example illustrated in FIG. 12, the setting unit 15 configures, as the first region 311, a region that is generated by scaling the circumscribed rectangle 312 by a factor of α relative to an upper right vertex of the circumscribed rectangle 312.

In contrast, the setting unit 15 may configure, as the first region, a region that is generated by scaling the circumscribed rectangle by a factor of α relative to an upper left vertex of the circumscribed rectangle when the L-shaped stroke group protrudes in a lower right direction. Likewise, the setting unit 15 may configure, as the first region, a region that is generated by scaling the circumscribed rectangle by a factor of α relative to a lower right vertex of the circumscribed rectangle when the L-shaped stroke group protrudes in an upper left direction. The setting unit 15 may configure, as the first region, a region that is generated by scaling the circumscribed rectangle by a factor of α relative to a lower left vertex of the circumscribed rectangle when the L-shaped stroke group protrudes in an upper right direction.

In addition, the setting unit 15 may configure a cell in the circumscribed rectangle 312 as the second region. The above cell includes an edge of the circumscribed rectangle 312 (touches the circumscribed rectangle 312) and is not included in the first region, among cells generated by dividing the circumscribed rectangle 312 into m×n rectangles (where m and n are integers equal to or greater than 3, and where m=3 and n=3 in the example illustrated in FIG. 12).

The shaping unit 17 and the display control unit 19 are similar to those in the above-described each embodiment.

Second Modification

In the above-described each embodiment, the example of the rectangle has been described as the figure of the predetermined category. In a second modification, a case where a figure of a predetermined category is a triangle will be described.

Figure 13:
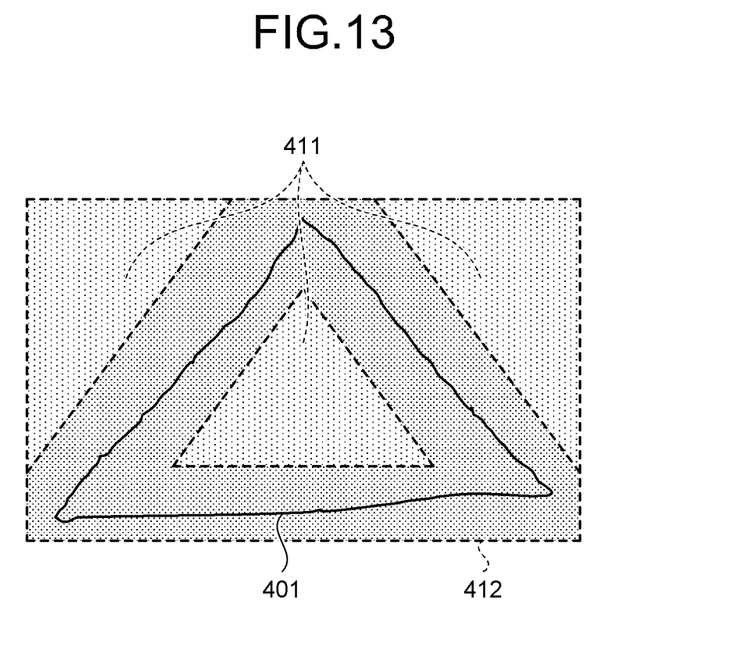
FIG. 13 is a diagram illustrating an example of a first region and a second region according to a second modification.

FIG. 13 is a diagram illustrating an example of a first region and a second region according to the second modification. The example illustrated in FIG. 13 assumes a case where the figure of the predetermined category is a triangle, as described above.

In the example illustrated in FIG. 13, a setting unit 15 configures, as a first region 411, a region that is generated by scaling a triangle inscribed in a circumscribed rectangle 412 by a factor of α (0<α<1) relative to a gravity point of the triangle in the circumscribed rectangle 412 of a triangular stroke group 401. Because the triangular stroke group 401 protrudes in an upward direction in the example illustrated in FIG. 13, the setting unit 15 configures, as the triangle inscribed in the circumscribed rectangle 412, a triangle generated by connecting three points including a lower left vertex, a lower right vertex, and a center of an upper side of the circumscribed rectangle 412.

When the triangle protrudes in a rightward direction, in contrast, the setting unit 15 may configure, as the triangle inscribed in the circumscribed rectangle, a triangle that is generated by connecting three points including an upper left vertex, a lower left vertex, and a center of a right side of the circumscribed rectangle. Likewise, when the triangle protrudes in a downward direction, the setting unit 15 may configure, as the triangle inscribed in the circumscribed rectangle, a triangle that is generated by connecting three points including an upper left vertex, an upper right vertex, and a center of a down side of the circumscribed rectangle. Likewise, when the triangle protrudes in a leftward direction, the setting unit 15 may configure, as the triangle inscribed in the circumscribed rectangle, a triangle that is generated by connecting three points including an upper right vertex, a lower right vertex, and a center of a left side of the circumscribed rectangle.

In addition to this central region, the setting unit 15 may also configure, as the first region, regions of a right triangle in both sides of a protruding corner. For example, when the triangular stroke group 401 protrudes in an upward direction, the setting unit 15 also configures, as the first region 411, a region of a right triangle generated by connecting three points including an upper left vertex, a point that divides an upper left vertex and an upper right vertex internally into a ratio of 1:2, and a point that divides an upper left vertex and a lower left vertex internally into a ratio of 2:1, of the circumscribed rectangle 412. The setting unit 15 also configures, as the first region 411, a region of a right triangle generated by connecting three points including an upper right vertex, a point that divides an upper left vertex and an upper right vertex internally into a ratio of 2:1, and a point that divides an upper right vertex and a lower right vertex internally into a ratio of 2:1, of the circumscribed rectangle 412.

In addition, the setting unit 15 may configure, as the second region, a region in the circumscribed rectangle 412, the region being not included in the first region 411.

The shaping unit 17 and the display control unit 19 are similar to those in the above-described each embodiment.

Third Modification

In the above-described each embodiment, the example of the rectangle has been described as the figure of the predetermined category. In a third modification, a case where a figure of a predetermined category is a rhombus will be described.

Figure 14:
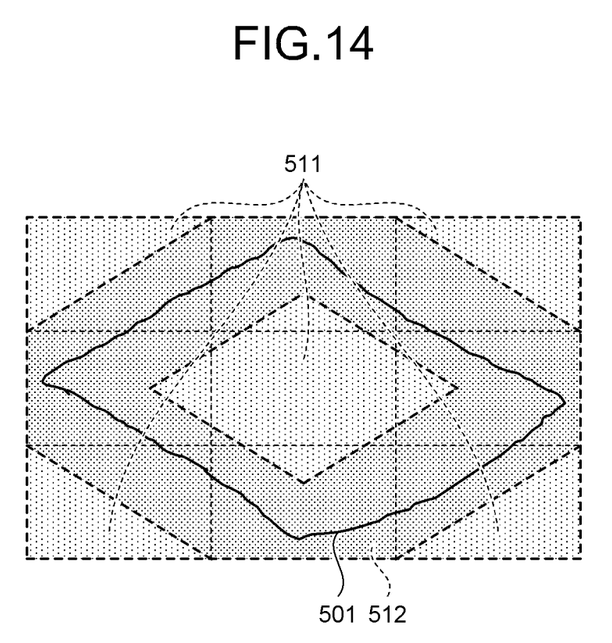
FIG. 14 is a diagram illustrating an example of a first region and a second region according to a third modification.

FIG. 14 is a diagram illustrating an example of a first region and a second region according to the third modification. The example illustrated in FIG. 14 assumes a case where the figure of the predetermined category is a rhombus, as described above.

In the example illustrated in FIG. 14, a setting unit 15 configures, as a first region 511, a region that is generated by scaling a rhombus inscribed in a circumscribed rectangle 512 of a rhombus stroke group 501 by a factor of α (0<α<1) relative to a gravity point of the rhombus in the circumscribed rectangle 512. In the example illustrated in FIG. 14, the setting unit 15 configures, as a rhombus inscribed in the circumscribed rectangle 512, a rhombus generated by connecting center points of each side of the circumscribed rectangle 512.

In addition to this central region, the setting unit 15 may also configure, as the first region, four regions of a right triangle in the vicinity of each vertex of the circumscribed rectangle 512. For example, the setting unit 15 also configures, as the first region 511, a region of a right triangle generated by connecting three points including an upper left vertex, a point that divides the upper left vertex and an upper right vertex internally into a ratio of 1:2, and a point that divides the upper left vertex and a lower left vertex internally into a ratio of 1:2, of the circumscribed rectangle 512. The setting unit 15 also configures, as the first region 511, a region of a right triangle generated by connecting three points including the upper right vertex, a point that divides the upper right vertex and the upper left vertex internally into a ratio of 1:2, and a point that divides the upper right vertex and a lower right vertex internally into a ratio of 1:2, of the circumscribed rectangle 512. The setting unit 15 also configures, as the first region 511, a region of a right triangle generated by connecting three points including the lower right vertex, a point that divides the lower left vertex and the lower right vertex internally into a ratio of 2:1, and a point that divides the upper right vertex and the lower right vertex internally into a ratio of 2:1, of the circumscribed rectangle 512. The setting unit 15 also configures, as the first region 511, a region of a right triangle generated by connecting three points including the lower left vertex, a point that divides the lower left vertex and the lower right vertex internally into a ratio of 1:2, and a point that divides the lower left vertex and the upper left vertex internally into a ratio of 1:2, of the circumscribed rectangle 512.

In addition, the setting unit 15 may configure, as the second region, a region in the circumscribed rectangle 512, the region being not included in the first region 511. The setting unit 15 may also configure a cell in the circumscribed rectangle 512 as the second region. The above cell includes a part of 50% or less thereof occupied by the first region, among cells generated by dividing the circumscribed rectangle 512 into m×n rectangles (where m and n are integers equal to or greater than 3, and where m=3 and n=3 in the example illustrated in FIG. 14).

Fourth Modification

In the above-described each embodiment, the example of a single predetermined category has been described. In a fourth modification, a case of a plurality of predetermined categories (for example, a rectangle, an L-shape, a triangle, and a rhombus) will be described.

In this case, for example, recognition of a rectangle described in the first embodiment is performed first. If not recognized as a rectangle, recognition of an L-shape described in the first modification is then performed. If not recognized as an L-shape, recognition of a triangle described in the second modification is then performed. If not recognized as a triangle, recognition of a rhombus described in the third modification is then performed. A stroke group may then be shaped into the recognized figure and outputted.

Hardware Configuration

Figure 15:
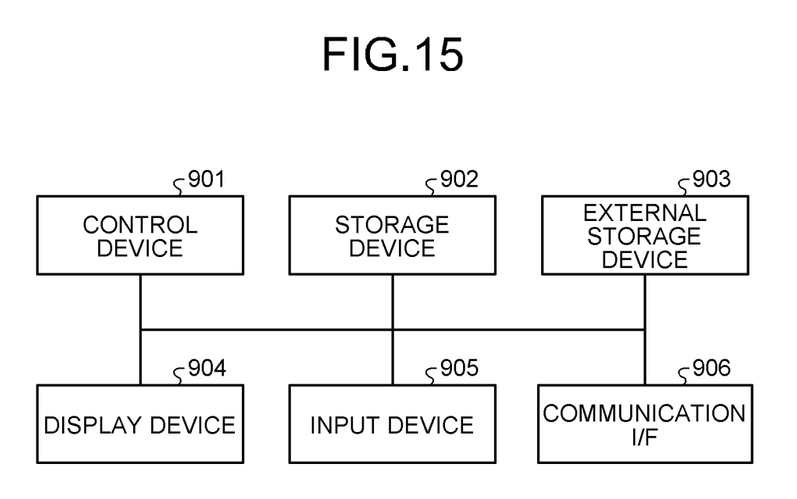
FIG. 15 is a diagram illustrating an example of a hardware configuration of a shaping device according to each embodiment and each modification.

FIG. 15 is a block diagram illustrating an example of a hardware configuration of the shaping device of the above-described each embodiment and each modification. As illustrated in FIG. 15, the shaping device of the above-described each embodiment and each modification includes a control device 901, such as a CPU, a storage device 902, such as read only memory (ROM) and random access memory (RAM), an external storage device 903, such as a hard disk drive (HDD) and a solid state drive (SSD), a display device 904, such as a display, an input device 905, such as a touch panel, and a communication interface 906. The shaping device can be realized by a hardware configuration using a standard computer.

A program to be executed by the shaping device of the above-described each embodiment and each modification is incorporated in a device such as ROM in advance and then provided. The program to be executed by the shaping device of the above-described each embodiment and each modification may be configured to be an installable file or an executable file. The program may be configured to be recorded in a computer-readable recording medium, such as a compact disk read only memory (CD-ROM), a compact disk recordable (CD-R), a memory card, a digital versatile disk (DVD), and a flexible disk (FD), and to be provided. The program to be executed by the shaping device of the above-described each embodiment and each modification may also be configured to be stored in a computer connected to a network, such as the Internet, and to be provided by allowing download via the network.

The program to be executed by the shaping device of the above-described each embodiment and each modification has a module configuration for realizing the above-described each unit in a computer. An actual hardware is configured to realize the above-described each unit in a computer by, for example, the control device 901 reading the program from the external storage device 903 into the storage device 902 for execution.

As described above, according to the above-described each embodiment and each modification, recognition performance may be improved while robustness of recognition is maintained.

For example, each step in the flowchart of the above-described embodiment may be performed by changing execution sequence, performing a plurality of steps concurrently, or performing the steps in different sequence each time the steps are performed, as long as such an action does not contradict the step's property.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A shaping device, comprising:
   an acquisition unit configured to acquire a stroke group handwritten by a user;
   a setting unit configured to set, when the stroke group constitutes a figure of a first category, a first region in which no stroke is expected to exist and a second region in which a stroke is expected to exist in a circumscribing rectangle circumscribing the stroke group;
   a shaping unit configured to shape the stroke group into the figure of the first category when a first feature value and a second feature value satisfy first and second conditions, respectively, the first feature value representing an occupancy condition of the stroke group in the first region, the second feature value representing an occupancy condition of the stroke group in the second region; and
   a display control unit configured to display a shaping result on a display unit.

2. The device according to claim 1, wherein
   the shaping unit is configured to
      calculate the first feature value and the second feature value, and
      shape the stroke group into the figure of the first category when the first feature value is less than or equal to a first threshold value and when the second feature value is greater than or equal to a second threshold value.

3. The device according to claim 2, wherein the shaping unit is configured to determine at least one of the first threshold value and the second threshold value by using at least one of the first feature value and the second feature value.

4. The device according to claim 2, wherein the shaping unit is configured to determine the second threshold value by using the first threshold value.

5. The device according to claim 2, wherein
   the figure of the first category is a rectangle, and
   the shaping unit is further configured to shape the stroke group into the rectangle when a total length of the stroke group is greater than or equal to a first proportion of a perimeter of the circumscribing rectangle.

6. The device according to claim 2, wherein
   the figure of the first category is a rectangle, and
   the shaping unit is further configured to shape the stroke group into the rectangle when the stroke group has more horizontal components and vertical components than components other than the horizontal components and the vertical components.

7. The device according to claim 1, wherein the first feature value is at least one of the number of sampling points of the stroke group in the first region, a total length of one or more strokes included in the first region among a plurality of strokes constituting the stroke group, and a total area in which a circumscribing rectangle of each of one or more strokes included in the first region among a plurality of strokes constituting the stroke group overlap the first region.

8. The device according to claim 1, wherein the second feature value is at least one of the number of sampling points of the stroke group in the second region, a total length of one or more strokes included in the second region among a plurality of strokes constituting the stroke group, and a total area in which a circumscribing rectangle of each of one or more strokes included in the second region among a plurality of strokes constituting the stroke group overlap the second region.

9. The device according to claim 1, wherein
the first region includes a center of the circumscribing rectangle, and
the second region includes at least a part of an edge of the circumscribing rectangle.

10. The device according to claim 1, wherein the shaping unit is configured to shape the stroke group into the figure of the first category, wherein the figure is made of a plurality of straight lines and an end of each straight line is connected to an end of another straight line.

11. The device according to claim 1, wherein
the acquisition unit is configured to acquire a stroke group set handwritten by the user,
the device further comprises an extraction unit configured to extract the stroke group from the stroke group set,
the setting unit is configured to set the first region and the second region in the circumscribing rectangle circumscribing the extracted stroke group.

\* \* \* \* \*